Oct. 29, 1963  W. C. THOMAS  3,108,768
AIRCRAFT WITH HIGH LIFT AIRFOIL CONSTRUCTION
Filed Oct. 12, 1960  2 Sheets-Sheet 1
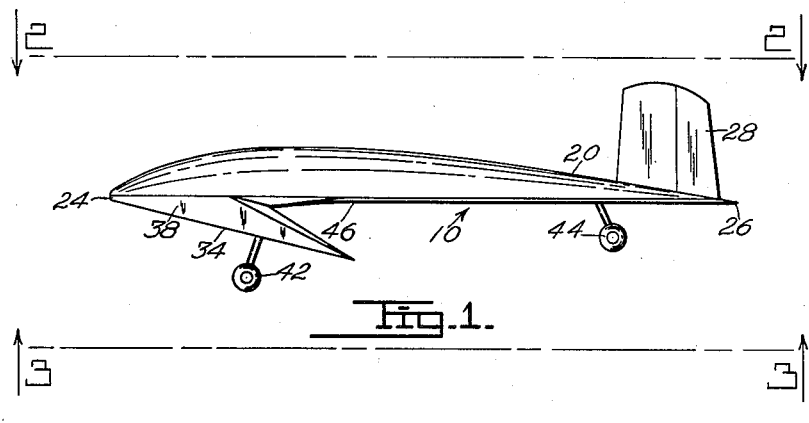
Fig. 1.
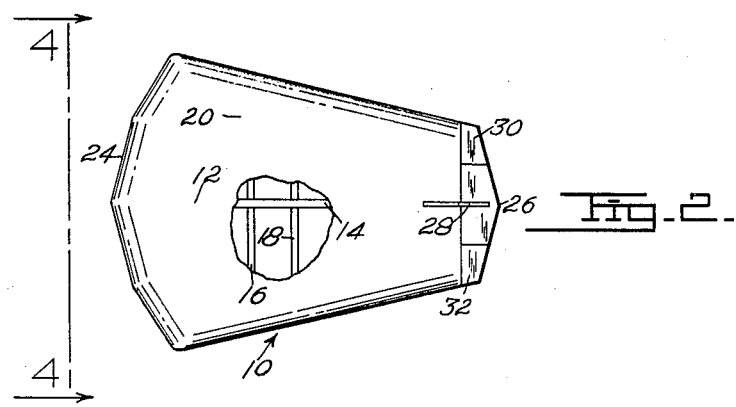
Fig. 2.
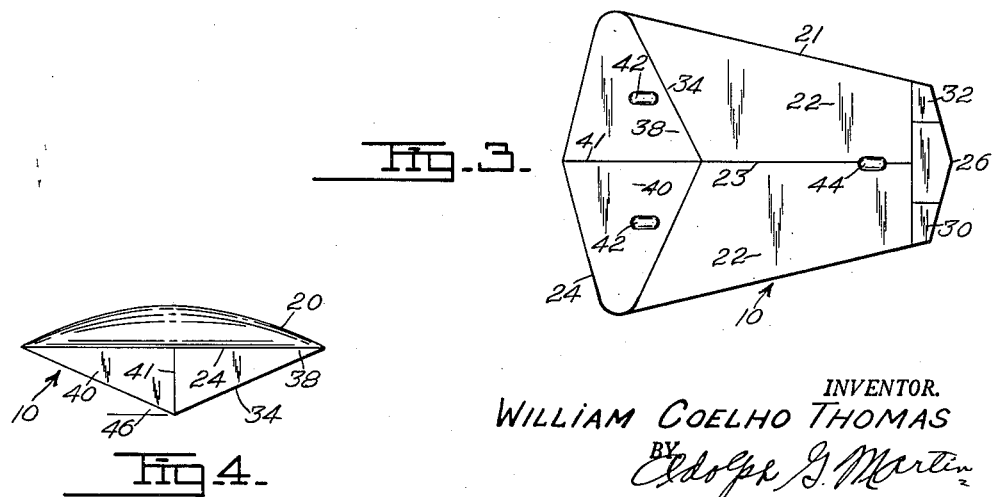
Fig. 3.
Fig. 4.
INVENTOR.
WILLIAM COELHO THOMAS
BY
ATTORNEY Oct. 29, 1963 W. C. THOMAS 3,108,768
AIRCRAFT WITH HIGH LIFT AIRFOIL CONSTRUCTION
Filed Oct. 12, 1960 2 Sheets-Sheet 2
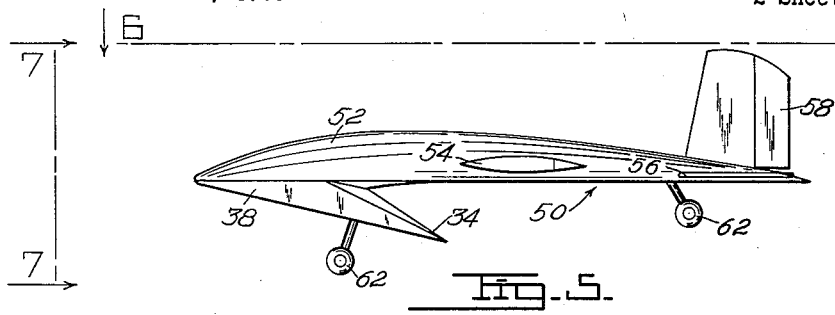
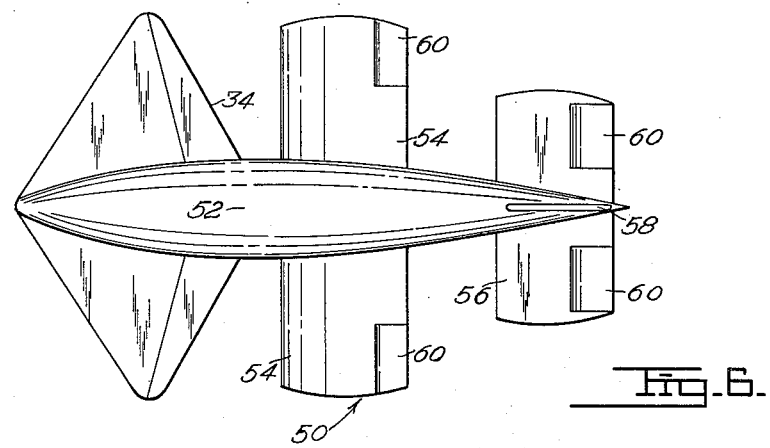
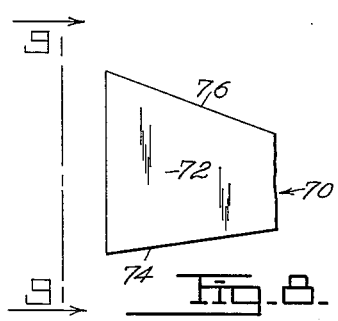
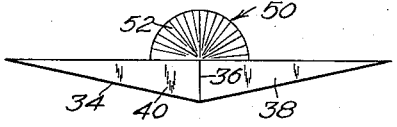
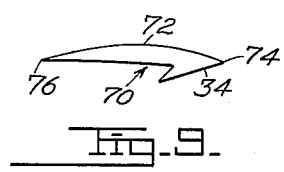
INVENTOR.
WILLIAM COELHO THOMAS
BY Adolph G. Martin
ATTORNEY United States Patent Office 3,108,768
Patented Oct. 29, 1963

3,108,768
AIRCRAFT WITH HIGH LIFT AIRFOIL
CONSTRUCTION
William Coelho Thomas, 11673 Wyoming,
Detroit, Mich.
Filed Oct. 12, 1960, Ser. No. 62,232
9 Claims. (Cl. 244—45)

This invention relates to aircraft generally, and more particularly to a type of airfoil section adapted for use in providing an aircraft with an exceedingly high lift characteristic.

Aircraft are being currently designed with laterally disposed wings having a span exceeding the fuselage in length. This sizeable wing area is necessary because of the poor lifting characteristics inherent in conventional wing design, and the inability of the fuselage to support in flight any appreciable portion of its weight. Large wing sections necessarily add tremendously to the plane cost, and also create many hanger and storage problems.

The matter of storage becomes exceedingly acute in the instance of fighter planes and small private planes, since space allocations for both are invariably minimal. Fully cognizant of the considerations of wing span and storage in aircraft, the applicant has, as the primary object of his invention, the provision of an extremely effective airfoil section adapted for use on conventional aircraft so as to reduce appreciably the wing area required to produce the necessary lifting effort for the craft.

Another object of the invention is the provision of an aircraft having a unitized structure in which shortened wings are integrated into a central fuselage so as to provide a substantially continuous and unbroken airfoil.

A further object of the invention is to provide an aircraft of the type previously described which is capable of producing appreciably more lifting effort than conventional aircraft with the same weight, power and speed.

Still another object of the invention is to provide an aircraft of the type previously described which is capable of sustaining flight at lower speeds, and with less power consumption, than conventional aircraft.

A still further object of the invention is the provision of an aircraft of the type previously described which is exceedingly strong, exceptionally stable in flight, and has a degree of maneuverability comparable to that of a conventional aircraft.

Additional features and advantages of the invention will become apparent after thorough consideration of a detailed description and discussion of the same composed with reference to the accompanying drawings, constituting a portion of this application, and in which:

FIGURE 1 is an elevation view disclosing the aircraft comprising the applicant's invention, and showing the relative angularity and proportionate size of the air deflector.

FIGURE 2 is a plan view taken substantially on plane 2—2 in FIGURE 1, disclosing the characteristic shape of the applicant's aircraft, with a section of the cover broken away to show structural details.

FIGURE 3 is a plan view taken substantially on plane 3—3 in FIGURE 1, showing the characteristic shape of the air deflector.

FIGURE 4 is an elevation view taken substantially on plane 4—4 in FIGURE 2, showing a front profile of the applicant's air deflector.

FIGURE 5 is an elevation view of a conventional aircraft with shortened wings, showing the applicant's air deflector applied to the forward portion of the fuselage.

FIGURE 6 is a plan view taken substantially on plane 6—6 in FIGURE 5, showing the span of the air deflector.

FIGURE 7 is an elevation view taken substantially on plane 7—7 in FIGURE 5, showing the front profile of the aircraft.

FIGURE 8 is a plan view showing a typical wing section of an aircraft.

FIGURE 9 is an elevation view taken substantially on plane 9—9 in FIGURE 8, showing the applicant's air deflector applied to an aircraft wing.

For a detailed description of the applicant's invention, reference is made to the drawings in which numeral 10 designates an aircraft having a longitudinal section or fuselage 12. A central member 14, in the longitudinal section or fuselage 12 has thereon a series of transverse members such as 16 and 18, graduated in length to provide the configuration shown in FIGURE 2. A cover is applied over the central and transverse members 14, 16 and 18, thereby providing an upper airfoil surface 20 and a lower airfoil surface 21 having common leading and trailing edges 24 and 26 respectively.

The lower airfoil surface 21 comprises two flat sections 22 extending upwardly and outwardly from a central axis 23. The flat sections 22 are disposed from the horizontal at an angle varying from 2 to 3 degrees to provide the requisite lateral stability for the aircraft. A control rudder 28 is movably mounted on the rear portion of the upper airfoil surface 20. A pair of spaced ailerons 30 and 32 are pivotally mounted on the rear of the aircraft 10. A downwardly and rearwardly disposed air deflector 34 is provided on the lower airfoil surface 21 along the forward or leading edge 24. The air deflector 34 has two flat surfaces 38 and 40 extending upwardly and outwardly from a medial axis 41.

The medial axis 41 of the air deflector 34 is disposed from the horizontal at an angle of 3 to 14 degrees with optimum results occurring at an angle of approximately 11 degrees. The dihedral angle 46 of the air deflector 34, as shown in FIGURE 4, produces the best results when it is not less than 8 degrees nor more than 11 degrees. A pair of suitably spaced landing wheels 42 are mounted on the two flat surfaces 38 and 40 of the air deflector 34. A single wheel 44 is provided on the under side of the longitudinal section 12 at the rear of the aircraft 10.

In practice, it is preferred that the front landing wheels 42 be of the retractable type, so that the applicant's air deflector 34 can be provided with an unbroken surface to insure the free flow of air over the two flat areas 38 and 40. The center of gravity of the aircraft 10 disclosed in FIGURES 1 through 4, is preferably located back of the forward end of the craft a distance of ¼ to ⅓ of its length.

The modification of the applicant's invention disclosed in FIGURES 5 through 7, shows an aircraft having a central fuselage 52, with two oppositely disposed lateral wings 54. A stabilizer 56 and a control rudder 58 are provided on the rear portion of the fuselage 52. Spaced control ailerons 60 are pivotally mounted on the stabilizer 56 and the lateral wings 54. An air deflector 34, similar in construction to that disclosed in FIGURES 1 through 4, is mounted on the forward end of the fuselage 52. Suitably spaced landing wheels 62 are mounted on the under side of the aircraft 50.

The modification of the applicant's invention disclosed in FIGURES 8 and 9, shows the applicant's airfoil section applied to wing construction which is suitable for use on conventional aircraft. A wing section 70 has thereon a typical upper airfoil surface 72 with a leading edge 74 and a trailing edge 76. The lower surface of the wing section 70 is modified along the leading edge 74 by placing thereon the applicant's air deflector 34. The air deflector 34, however, can be applied with equal effectiveness on any portion of the lower surface of the wing section 70.

It has been determined that by use of the applicant's air deflector 34 in the manners shown in FIGURES 5 through 9, the required wing area can be reduced as much as 50 percent without effecting the lifting characteristics of the aircraft. Based upon the foregoing discussion, the applicant is of the opinion that his invention has fulfilled a long felt need in the field of aeronautics, and that he was accordingly made a valuable contribution to the related art. However, while the invention was described with reference to the structural details of a limited number of embodiments, it will be appreciated by those skilled in the art that the principles involved are susceptible of numerous other practical applications.

Therefore, I claim as new, and desire to secure by Letters Patent:

1. An aircraft comprising a fuselage having upper and lower airfoil surfaces having a common leading edge and a stationary downwardly and rearwardly projecting air deflector disposed along the entire leading edge.

2. In an aircraft comprising a fuselage having upper and lower airfoil surfaces with a common leading edge, said fuselage having a longitudinal axis and an air deflector on the lower airfoil surface downwardly and rearwardly disposed along the entire leading edge, such air deflector having a medial axis coincident with the longitudinal axis of said fuselage.

3. In an aircraft comprising a fuselage having upper and lower airfoil surfaces with a common leading edge, said fuselage having a longitudinal axis and an air deflector along the leading edge of the airfoil surfaces, such air deflector having a medial axis downwardly at a fixed angle disposed from the longitudinal axis of the central section and coincident therewith and a lower surface thereon extending upwardly and outwardly from the medial axis to the perimeter of the aircraft.

4. An aircraft comprising a substantially planar member having upper and lower airfoil surfaces, said surfaces forming a common leading edge, a downwardly and rearwardly disposed air deflector fixed to said leading edge, the center of gravity of said aircraft being located at a distance of ¼ to ⅓ of the length of the aircraft rearward of the forward end of the aircraft.

5. An aircraft comprising a substantially planar member having upper and lower airfoil surfaces conjoined so as to form a common horizontal leading edge, an air deflector fixed to said leading edge and having a median axis substantially at right angles to said leading edge and extending rearwardly downwards from said leading edge at an angle between 3 and 14 degrees, said air deflector comprising planar portions extending outwardly and upwardly from said median axis towards said leading edge.

6. The structure set forth in claim 5 wherein the angle between each of said planar portions and the horizontal plane is between 8 and 11 degrees.

7. The structure set forth in claim 6 wherein said planar member includes a longitudinal axis in the vertical plane of said median axis, and wherein said lower airfoil surface comprises a rearward planar surface on each side of said longitudinal axis, each of said surfaces extending upwardly and outwardly from said longitudinal axis at an angle of 2 to 3 degrees from the horizontal plane.

8. An aircraft comprising a central fuselage with oppositely disposed lateral wings, and an air deflector mounted at the forward end of said fuselage and extending laterally on opposite sides of said fuselage, said deflector having upper and lower airfoil surfaces meeting at a common leading edge.

9. The structure of claim 8 wherein said deflector includes a median axis extending in the vertical plane of said fuselage and extending rearwardly downward from said leading edge at an angle of 3 to 14 degrees from the horizontal plane.

References Cited in the file of this patent

UNITED STATES PATENTS

| | | |
|---|---|---|
| 376,937 | Beeson | Jan. 24, 1888 |
| 1,014,731 | Way | Jan. 16, 1912 |
| 1,818,322 | Hall | Aug. 11, 1931 |
| 1,842,613 | Karr | Jan. 26, 1932 |
| 2,730,312 | Crookes | Jan. 10, 1956 |
| 2,926,869 | Sullivan | Mar. 1, 1960 |

FOREIGN PATENTS

| | | |
|---|---|---|
| 21,196 | France | Apr. 6, 1920 |
| 296,690 | Italy | May 21, 1932 |
| 84,417 | Germany | May 29, 1895 |
| 296,536 | Germany | Feb. 21, 1912 |
| 459,730 | Great Britain | Jan. 14, 1937 |